United States Patent
Katayama et al.

(10) Patent No.: US 11,387,503 B2
(45) Date of Patent: Jul. 12, 2022

(54) BATTERY MOUNTING DEVICE

(71) Applicant: MAZDA MOTOR CORPORATION, Hiroshima (JP)

(72) Inventors: Kenji Katayama, Hiroshima (JP); Ryuhei Sumita, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 336 days.

(21) Appl. No.: 16/682,803

(22) Filed: Nov. 13, 2019

(65) Prior Publication Data

US 2020/0212519 A1 Jul. 2, 2020

(30) Foreign Application Priority Data

Dec. 26, 2018 (JP) .............................. JP2018-242864

(51) Int. Cl.
| | |
|---|---|
| *H01M 10/613* | (2014.01) |
| *B60K 1/04* | (2019.01) |
| *H01M 10/625* | (2014.01) |
| *H01M 10/6556* | (2014.01) |

(52) U.S. Cl.
CPC ............ *H01M 10/613* (2015.04); *B60K 1/04* (2013.01); *H01M 10/625* (2015.04); *H01M 10/6556* (2015.04)

(58) Field of Classification Search
CPC ............ H01M 10/613; H01M 10/625; H01M 10/6556; H01M 10/6561; B60K 1/04; B60K 11/06; B60K 2001/005; B60K 2001/0411; B60Y 2306/01; Y02E 60/10
See application file for complete search history.

(56) References Cited

U.S. PATENT DOCUMENTS

| | | | | |
|---|---|---|---|---|
| 8,673,467 | B2 * | 3/2014 | Katano | ................ B60L 3/0007 429/7 |
| 9,561,735 | B2 * | 2/2017 | Nozaki | ................... B60K 1/04 |
| 10,497,997 | B2 * | 12/2019 | Subramanian | ...... H01M 10/647 |
| 2005/0092538 | A1 * | 5/2005 | Baldwin | ................ B62K 11/10 180/220 |
| 2012/0160584 | A1 * | 6/2012 | Nitawaki | ................. B60K 1/04 180/68.5 |
| 2013/0026786 | A1 * | 1/2013 | Saeki | ....................... B60K 1/04 296/187.08 |
| 2013/0092348 | A1 * | 4/2013 | Bito | .................. H01M 10/6562 165/41 |
| 2013/0153312 | A1 * | 6/2013 | Kosaki | .................... B60L 50/66 180/65.1 |
| 2013/0248268 | A1 * | 9/2013 | Matsuda | ............... B60L 3/0007 903/952 |

(Continued)

FOREIGN PATENT DOCUMENTS

| | | | | |
|---|---|---|---|---|
| CN | 101682008 | A * | 3/2010 | ........ H01M 10/0413 |
| JP | 2007050803 | A * | 3/2007 | ............ Y02E 60/10 |

(Continued)

*Primary Examiner* — Kaity V Chandler
(74) *Attorney, Agent, or Firm* — Studebaker & Brackett PC

(57) ABSTRACT

The present invention is a battery mounting device which comprises a battery mounted in a cabin of a vehicle, a plate-shaped toe board provided in front of a passenger seat at a position located at a lower level than the passenger seat so as to cover the battery, wherein the battery is provided between the toe board and a floor panel of the vehicle.

7 Claims, 7 Drawing Sheets

(56) References Cited

U.S. PATENT DOCUMENTS

| | | | | |
|---|---|---|---|---|
| 2014/0045367 A1* | 2/2014 | Christie | | H01M 50/20 439/500 |
| 2015/0217707 A1* | 8/2015 | Tanigaki | | B60L 50/66 180/65.1 |
| 2015/0365136 A1* | 12/2015 | Miller | | H02J 50/40 307/104 |
| 2016/0285142 A1* | 9/2016 | Kimura | | B60K 1/04 |
| 2017/0066479 A1* | 3/2017 | Murata | | B62D 21/15 |
| 2017/0088182 A1* | 3/2017 | Hara | | B62D 25/2072 |
| 2017/0166048 A1* | 6/2017 | Saeki | | B60K 15/063 |
| 2017/0271727 A1* | 9/2017 | Ito | | B60L 50/60 |
| 2017/0320381 A1* | 11/2017 | Milton | | B60L 50/64 |
| 2018/0029459 A1* | 2/2018 | Okada | | B60L 50/66 |
| 2018/0029463 A1* | 2/2018 | Ajisaka | | B60K 11/04 |
| 2018/0065490 A1* | 3/2018 | Goitsuka | | B60K 15/063 |
| 2018/0111483 A1* | 4/2018 | Nakayama | | B60L 50/64 |
| 2018/0186227 A1* | 7/2018 | Stephens | | B60L 50/66 |
| 2018/0237075 A1* | 8/2018 | Kawabe | | B60L 50/66 |
| 2018/0272852 A1* | 9/2018 | Ajisaka | | B60K 1/04 |
| 2019/0009662 A1* | 1/2019 | Toyota | | B60K 1/04 |
| 2019/0061507 A1* | 2/2019 | Nitta | | H01M 50/20 |
| 2019/0276083 A1* | 9/2019 | Saunders | | B60K 1/04 |
| 2020/0023724 A1* | 1/2020 | Nuruki | | B60K 1/04 |
| 2020/0047811 A1* | 2/2020 | Shimizu | | B60K 1/04 |
| 2020/0070641 A1* | 3/2020 | Kosuge | | H01M 50/20 |
| 2020/0070671 A1* | 3/2020 | Ohkuma | | B60K 1/04 |
| 2020/0079227 A1* | 3/2020 | de Hesselle | | B60L 50/64 |
| 2020/0140021 A1* | 5/2020 | Grottke | | B62D 25/025 |
| 2020/0148269 A1* | 5/2020 | Amrit | | B60R 19/26 |
| 2020/0161692 A1* | 5/2020 | Yoshitomi | | H01M 8/1004 |
| 2020/0189665 A1* | 6/2020 | Friedman | | B62D 29/041 |

FOREIGN PATENT DOCUMENTS

| | | | | | |
|---|---|---|---|---|---|
| JP | 2011098672 A | * | 5/2011 | | B62D 21/11 |
| JP | 2018-16143 A | | 2/2018 | | |
| WO | WO-2013088896 A | * | 6/2013 | | B60K 15/063 |
| WO | WO-2013088896 A1 | * | 6/2013 | | B60K 15/063 |

* cited by examiner

Inward ⟵⟶ Outward

In Vehicle Width Direction

Inward ⟵⟶ Outward
In Vehicle Width Direction

BATTERY MOUNTING DEVICE

BACKGROUND OF THE INVENTION

The present invention relates to a battery mounting device, and in particular relates to a mounting device of a battery mounted on a vehicle.

Japanese Patent Laid-Open Publication No. 2018-16143 discloses a battery cooling device. In this battery cooling device, a battery mounted on a vehicle is provided above a floor panel of the vehicle and below a passenger seat and a console box, and cooling air is supplied to the battery by a blower which is provided below the passenger seat so as to cool the battery.

Herein, it is unavoidable that the battery mounted on the vehicle becomes large sized to a certain degree. Therefore, in a case where the battery is stored below the seat of the vehicle like the battery cooling device disclosed in the above-described patent document, there is a problem that a space formed above the seat becomes so narrow that the distance between a head portion of a passenger and a ceiling surface of a cabin may become improperly short, thereby giving the passenger a feeling of oppression. This problem may be remarkable especially for a sports-type vehicle which has a relatively-short vehicle height as a whole. Further, while there exists a vehicle in which the battery is disposed in back of a rear seat, there is a problem that a trunk space for loading baggage becomes so narrow that the usability of the vehicle may be worsened.

SUMMARY OF THE INVENTION

Accordingly, an object of the present invention is to provide a battery mounting device which can mount the battery on the vehicle, without giving the passenger the feeling of oppression or making the trunk space improperly narrow.

The present invention is a battery mounting device, comprising a battery mounted in a cabin of a vehicle, a plate-shaped toe board provided in front of a passenger seat (assistant driver's seat) at a position located at a lower level than the passenger seat so as to cover the battery, wherein the battery is provided between the toe board and a floor panel of the vehicle.

According to the present invention, since the toe board is provided in front of the passenger seat at the position located at the lower level than the passenger seat and the battery is provided between the toe board and the floor panel of the vehicle, a sufficiently-large battery storage space can be secured, minimizing the feeling of oppression given to the passenger. In general, a space near a toe of the passenger seated in the passenger seat becomes a perfect dead space when no passenger is seated in the passenger seat, and even if the battery occupies this space, no inconvenience is given to the passenger. Further, even in a case where the passenger is seated in the passenger seat, the passenger may not feel any inconvenience depending on a body size of the passenger. Meanwhile, in a case where the large-sized passenger is seated in the passenger seat, it is likely that the battery stored near the toe of the passenger becomes an obstacle improperly. Even in this case, however, a sufficient space for the passenger is possibly secured by sliding the passenger seat rearwardly. Therefore, according to the battery mounting device of the present invention, a situation where the stored battery may cause the passenger to feel some inconvenience is limited to a case where the passenger has the large body size and the passenger seat is unable to be slid rearwardly.

Thus, according to the battery mounting device, the sufficiently-large battery storage space can be secured, properly suppressing any bad influence caused by the battery occupying some space in the cabin.

In an embodiment of the present invention, the toe board arranged above the floor panel is provided to be inclined such that a forward side thereof is located at a higher level than a rearward side thereof.

According to this embodiment, since the toe board is provided near the toe of the passenger to be inclined such that its forward side is located relatively at the higher level, the passenger can utilize the toe board a footrest, so that the feeling of oppression given to the passenger can be minimized, securing the sufficiently-large space for the battery. Further, since the battery is covered with the toe board, it can be properly prevented that even in a case where the battery receives an excessively-large force from a foot of the passenger during deceleration of the vehicle or the like, the battery gets damage because of this excessively-large force acting on the battery.

In another embodiment of the present invention, the battery arranged above the floor panel and below the toe board is provided to be inclined such that a forward side thereof is located at a higher level than a rearward side thereof.

According to this embodiment, since the battery is inclined such that its forward side is located relatively at the higher level s well as the toe board, it is unlikely that there occurs a dead space below the toe board, thereby utilizing the space effectively.

In another embodiment of the present invention, the toe board is provided with a fragile portion at an inward part, in a vehicle width direction, of the toe board such that the fragile portion of the toe board is deformed preferentially in a vehicle side collision.

According to this embodiment, the fragile portion is provided at the inward part, in the vehicle width direction, of the toe board. Thereby, this fragile portion is deformed in the vehicle side collision or the like, so that the battery is allowed to move and thereby it can be properly suppressed that the battery itself gets some damage.

In another embodiment of the present invention, a cooling duct where battery-cooling air flows is provided below the fragile portion of the toe board.

According to this embodiment, since the cooling duct is provided below the fragile portion of the toe board, this cooling duct is deformed in the vehicle side collision or the like as well as the fragile portion of the toe board, so that it can be properly suppressed that the battery itself gets some damage.

In another embodiment of the present invention, the battery mounting device further comprises a wire harness electrically coupled to the battery, wherein the toe board is made of metal and provided so as to cover the wire harness.

In general, large current flows through the wire harness coupled to the battery, and therefore electromagnetic waves are radiated from the wire harness. Accordingly, there is a concern that if a communication device and the like are positioned neat the wire harness, these devises may malfunction. According to this embodiment, however, since the wire harness is covered with the metal-made toe board, the electromagnetic waves radiated from the wire harness can be shielded, so that the communication device and the like can be prevented from malfunctioning.

Other features, aspects, and advantages of the present invention will become apparent from the following description which refers to the accompanying drawings.

DETAILED DESCRIPTION OF THE INVENTION

Figure 1:
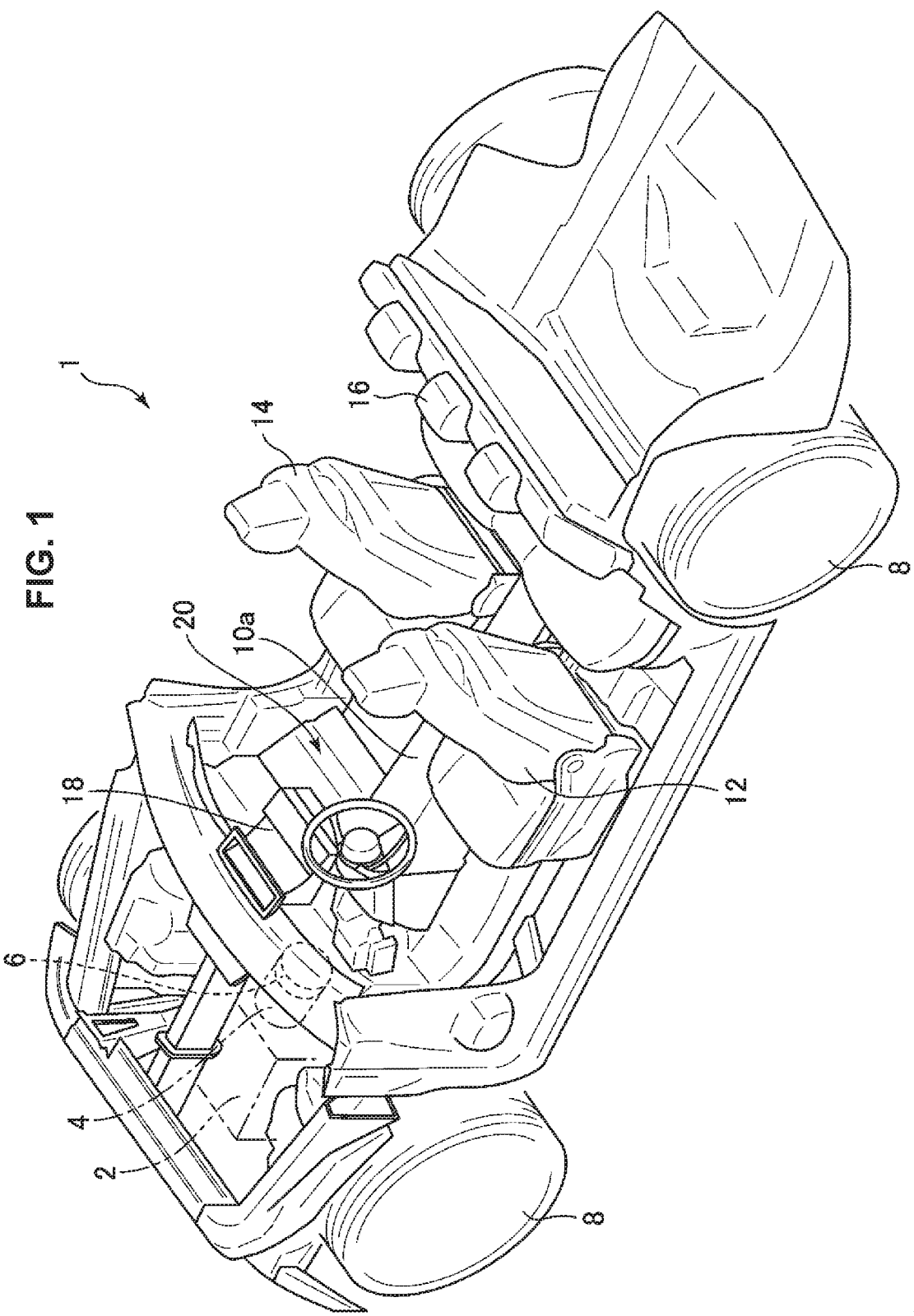
FIG. 1 is a perspective view of a vehicle on Which a battery mounting device according to an embodiment of the preset invention is mounted.
Figure 2:
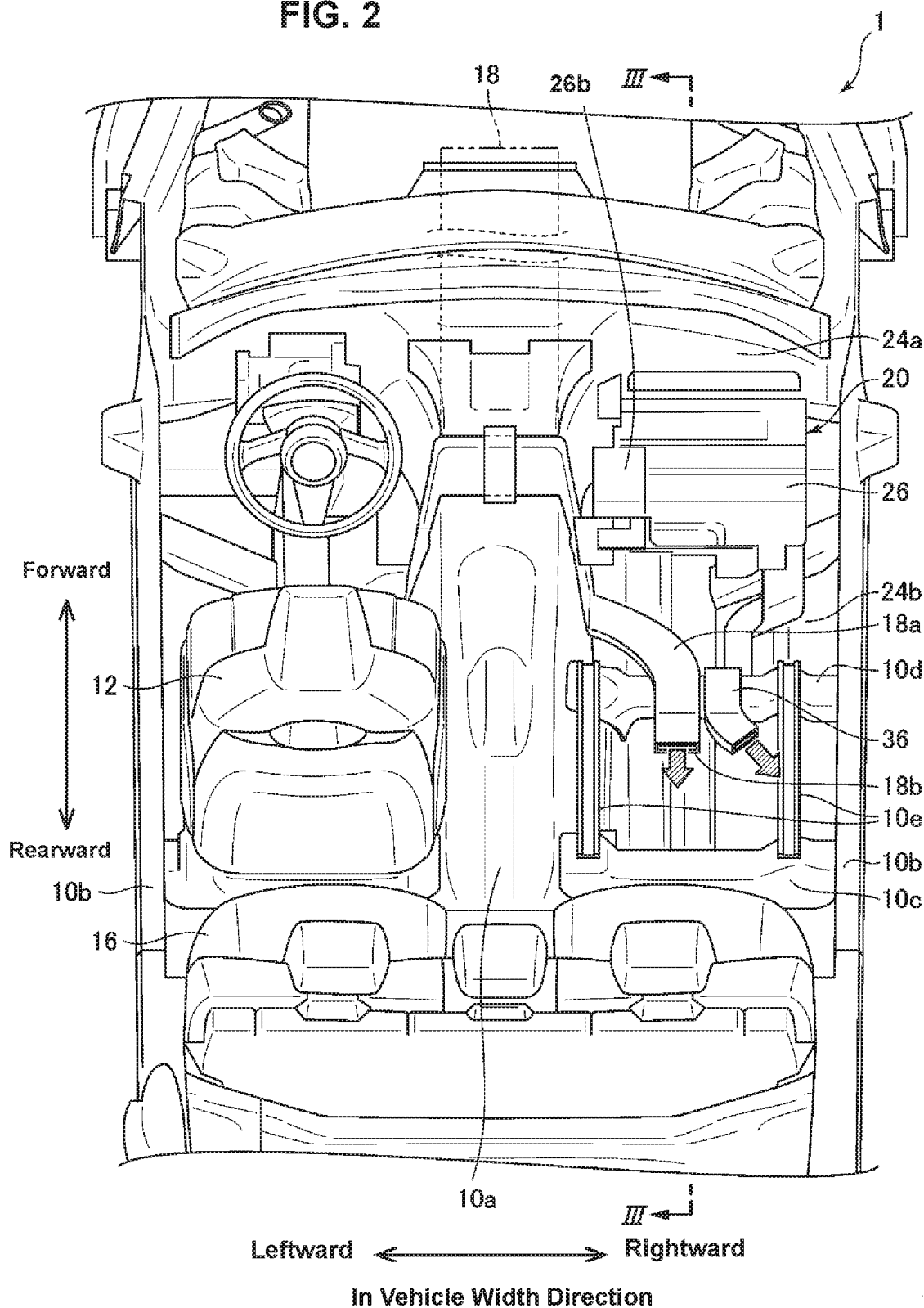
FIG. 2 is a perspective view of the vehicle on which the battery mounting device according to the embodiment of the preset invention is mounted, when viewed from an obliquely upward side.
Figure 3:
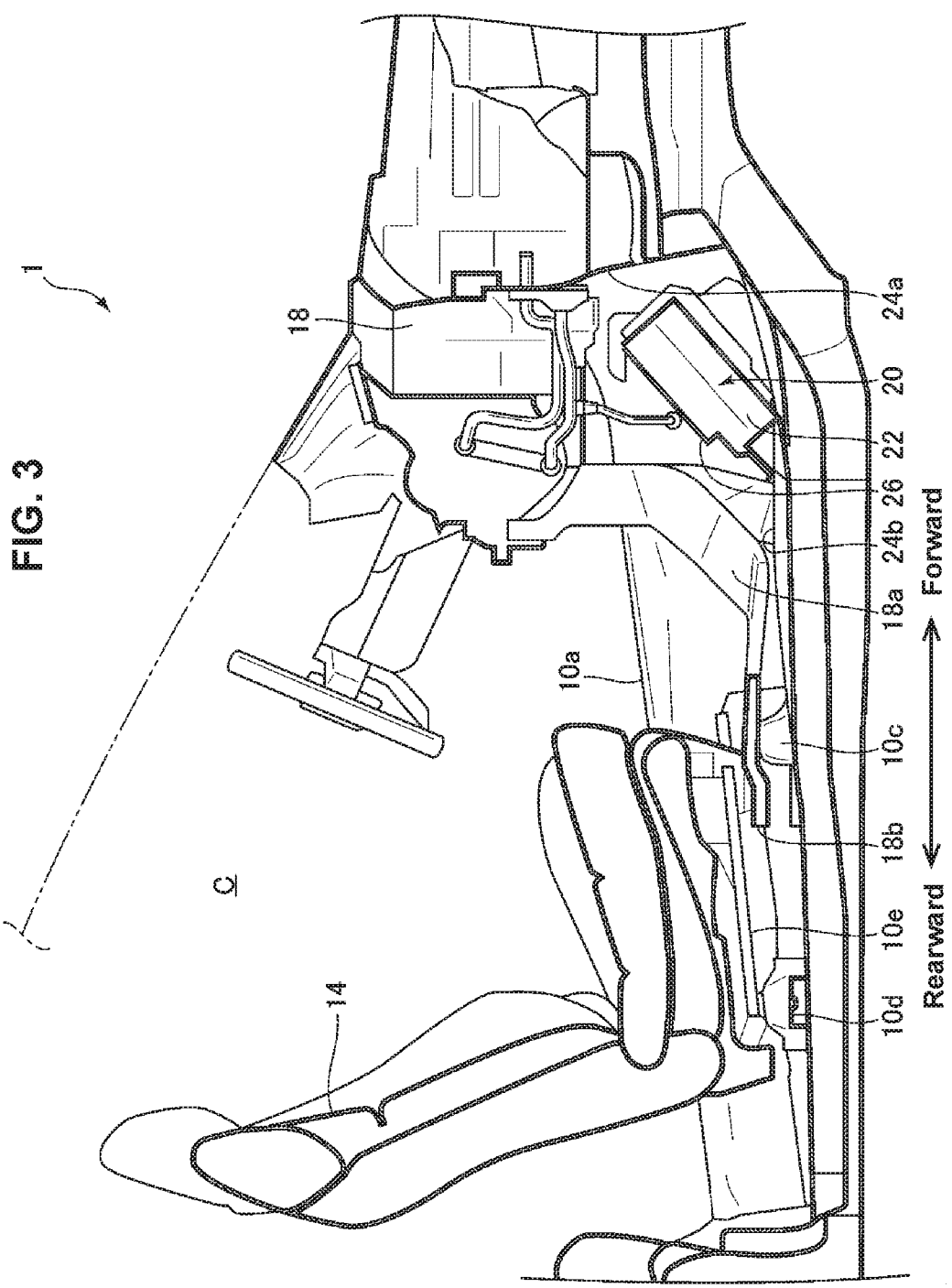
FIG. 3 is a side sectional view taken along line III-III of FIG. 2.

Hereafter, an embodiment of the present invention will be described referring to the drawings. FIG. 1 is a perspective view of a vehicle 1 on which a battery mounting device according to an embodiment of the preset invention is mounted. FIG. 2 is a perspective view of the vehicle 1 on which the battery mounting device according to the embodiment of the preset invention is mounted, when viewed from an obliquely upward side. FIG. 3 is a side sectional view taken along line III-III of FIG. 2.

As shown in FIG. 1, the vehicle 1 on which the battery mounting device of the present embodiment is mounted is a so-called FR vehicle equipped with driving rear wheels 8, in which an engine 2, a motor/generator 4, and a transmission 6 are provided at a front part of the vehicle 1 such that these devices are disposed in order from a forward side of the vehicle 1. A power generated by the engine 2 or the motor/generator 4 is transmitted to the rear wheels 8 through a propeller shaft (not illustrated) which extends in a longitudinal direction at a center, in a vehicle width direction, of the vehicle 1. The propeller shaft is configured to pass through in a tunnel portion 10a which extends in the longitudinal direction of the vehicle 1 between a driver's seat 12 and a passenger seat 14. Further, a pair of rear seats 16 are provided behind the driver's seat 12 and the passenger seat 14. Moreover, a heater unit 18 to heat an inside of a cabin is provided at a vehicle's central part which is located in front of the driver's seat 12 and the passenger seat 14.

As shown in FIG. 2, a pair of side members 10b are provided to extend in the vehicle longitudinal direction along both side faces of the vehicle 1. Herein, FIG. 2 shows a state where the passenger seat 14 is detached. Further, a first cross member 10c and a second cross member 10d which respectively extend in the vehicle width direction are provided to interconnect the side members 10b and the tunnel portion 10a, respectively (a passenger-seat side is illustrated only in FIG. 2). The first cross member 10c is positioned near respective rear end portions of the driver's seat 12 and the passenger seat 14 (not illustrated in FIG. 2), and the second cross member 10d is positioned near respective front end portions of the driver's seat 12 and the passenger seat 14.

A pair of seat rails 10e are attached between the first cross member 10c and the second cross member 10d such that these seat rails 10e extend in the longitudinal direction of the vehicle 1 (a passenger-seat side is illustrated only in FIG. 2). That is, each front portion of the seat rails 10e is attached to the second cross member 10d and each rear portion of the seat rails 10e is attached to the first cross member 10c. Each of the driver's seat 12 and the passenger seat 14 is supported at the pair of seat rails 10e extending in parallel so as to slide in the longitudinal direction of the vehicle 1.

As shown in FIG. 2, a heater air duct 18a is connected to the heater unit 18 provided at the front part of the vehicle 1. This heater air duct 18a extends rearwardly from the heater unit 18 up to a space below the passenger seat 14, passing through above the second cross member 10d. Thus, heater air which is heated by the heart unit 18 is guided by the heater unit 18a, blown rearwardly from a blowing port 18b which is positioned below the passenger seat 14, and flows into the space below the rear seat 16.

Next, a battery mounting device 20 according to the embodiment of the present invention which includes a battery 22 is provided in a cabin C as shown in FIG. 3, and this battery mounting device 20 is provided in front of the passenger seat 14 at a position located at a lower level than the passenger seat 14. In other words, the battery 20 is provided right behind a dash panel 24a in the cabin C and above a floor panel 24b, inclined such that its forward side thereof is located at a higher level than its rearward side, and positioned near a toe of a passenger seated in the passenger seat 14. The battery 22 is configured to charge an electric power regenerated or generated by the motor/generator 4. The charged electric power is used for driving the motor/generator 4 and operating other onboard electric devices illustrated). Herein, the details of the battery mounting device 20 will be described later.

Further, a plate-shaped toe board 26 which is made of metal is provided above the battery 22 and the battery 22 is covered with this toe board 26 from above. That is, the battery 22 is provided in front of the toe board 26 and the passenger seat 14 at a position located at a lower level than the passenger seat 14. Consequently, the battery 22 is provided between the toe board 26 and the floor panel 24b of the vehicle 1. Also, the toe board 26 is provided to be inclined along an upper surface of the battery 22 such that its front side is located at a higher level than its rear side, and this toe board 26 is positioned near the toe of the passenger seated in the passenger seat 14. Accordingly, the toe board 26 can be also used as a footrest. Herein, the toe board 26 has a sufficient strength so that it can be properly prevented that the battery 22 gets damage even in a case where the battery 22 receives an excessively-large force from a foot of the passenger during deceleration of the vehicle 1 or the like.

Figure 4:
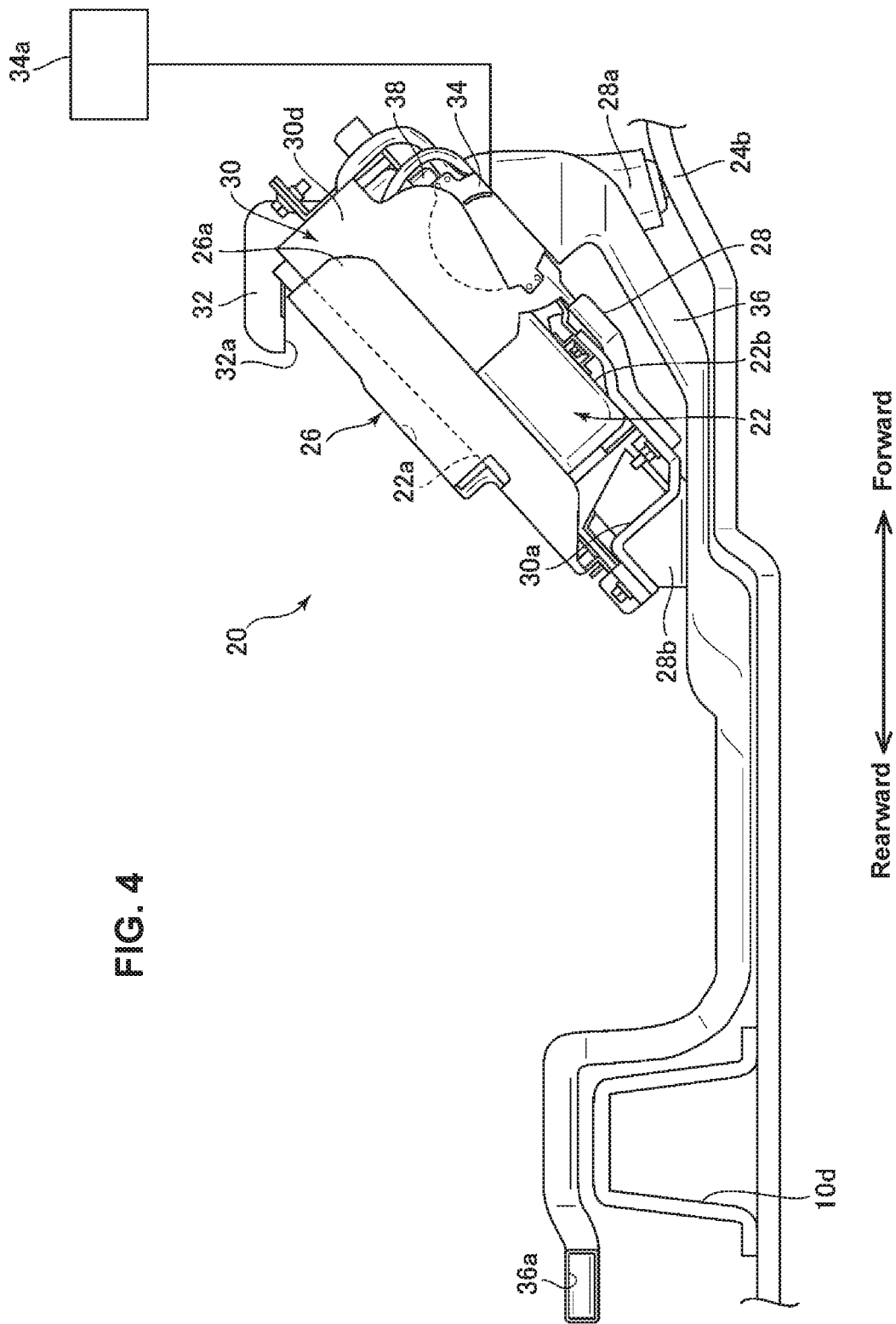
FIG. 4 is a side view of the battery mounting device according to the embodiment of the preset invention.
Figure 5:
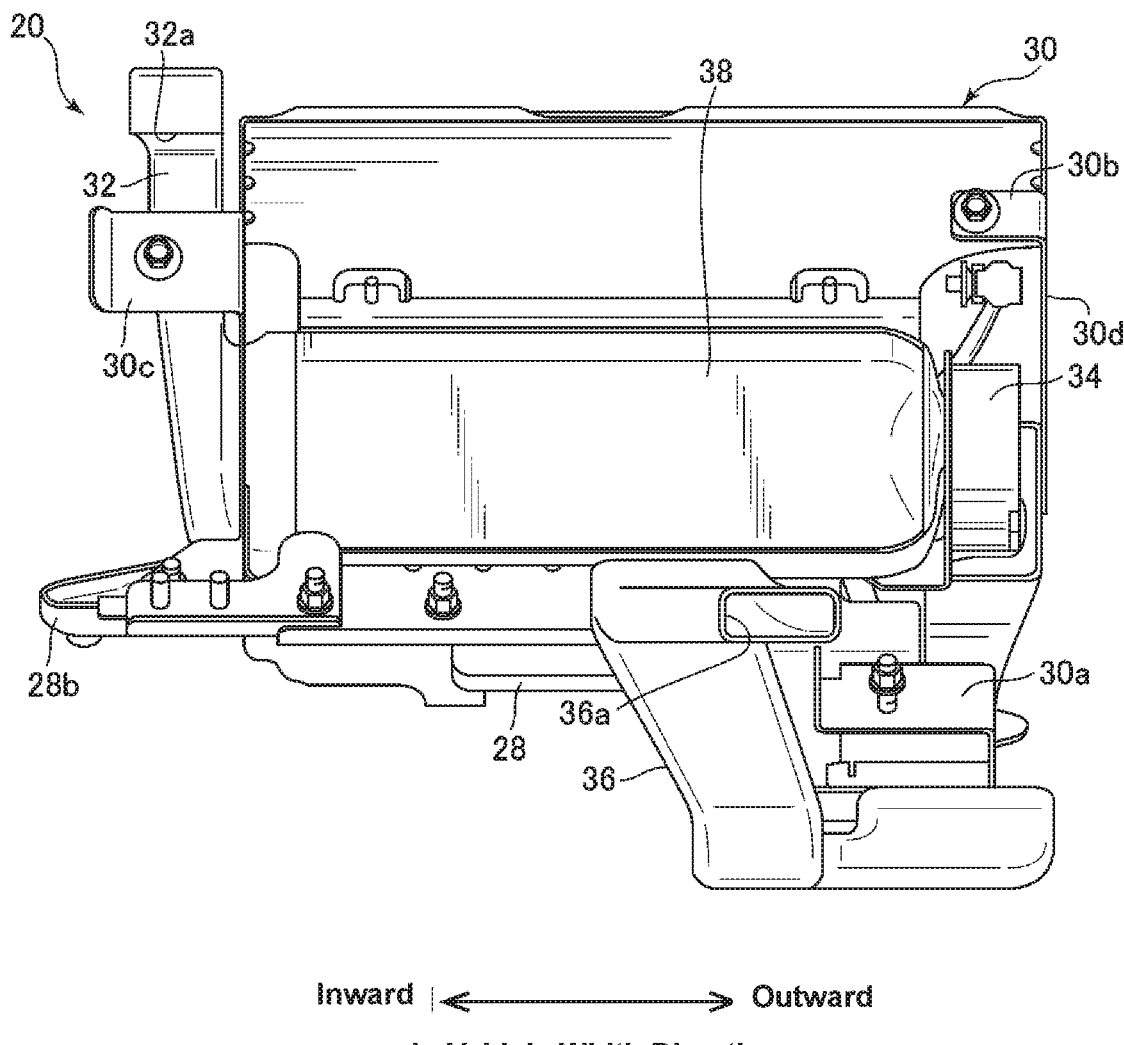
FIG. 5 is an elevational view of the battery mounting device according to the embodiment of the preset invention, which shows a state where a battery and a toe board are detached.
Figure 6:
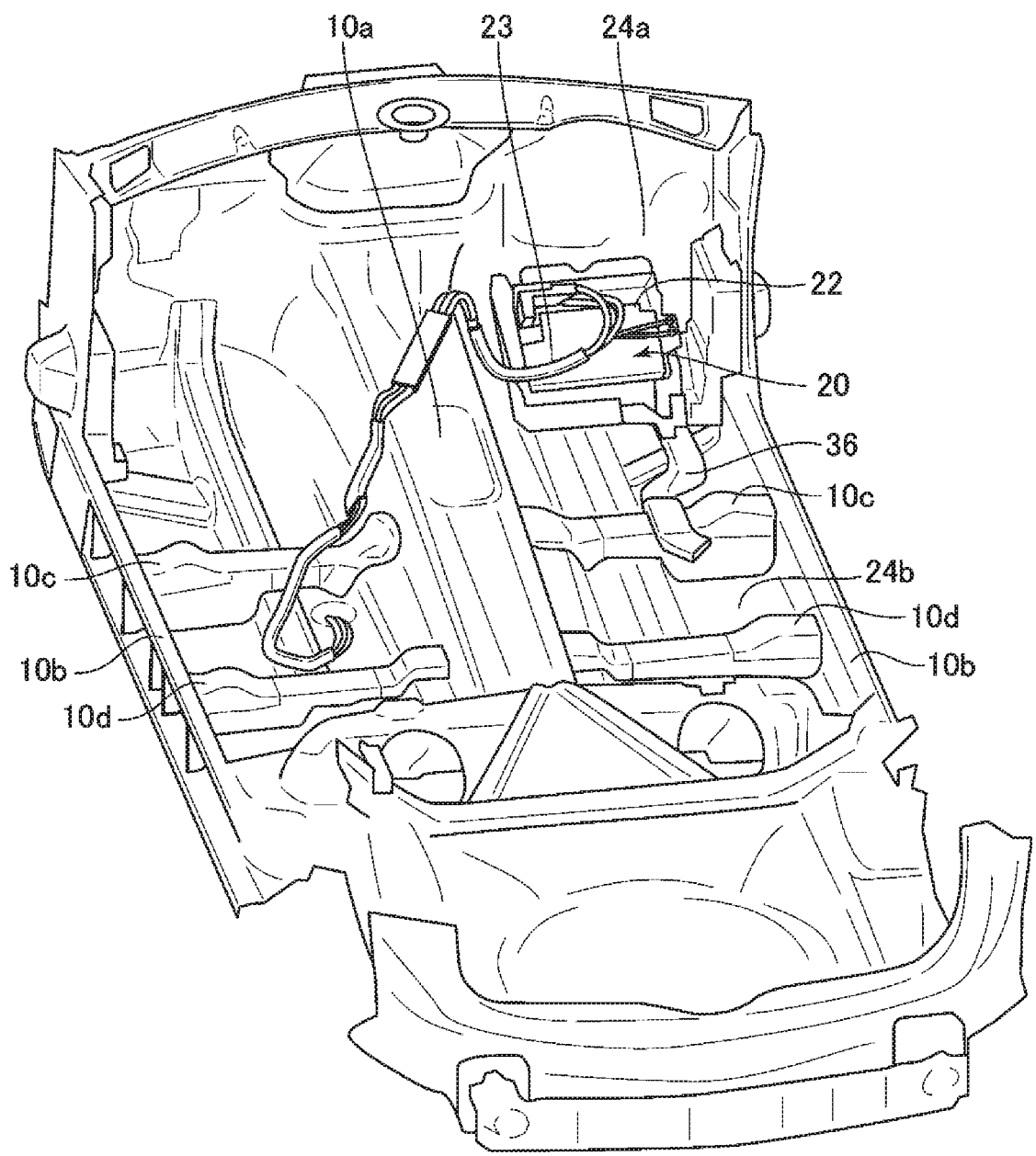
FIG. 6 is a perspective view of the battery mounting device according to the embodiment of the preset invention, which shows layout of wire harnesses extending from the battery.
Figure 7:
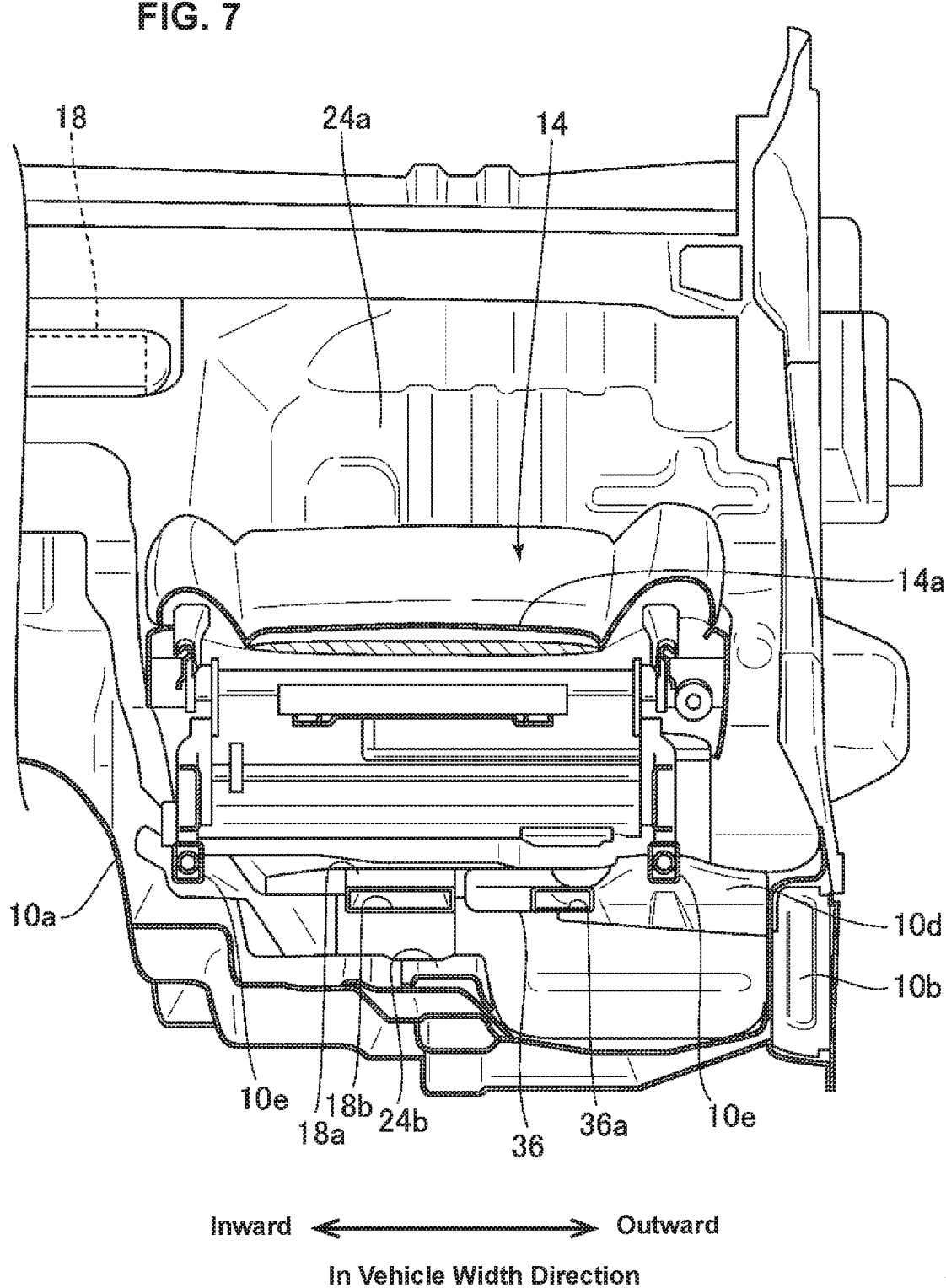
FIG. 7 is a sectional view of the battery mounting device according to the embodiment of the preset invention, which shows an exhaust port of an exhaust duct.

Next, the battery mounting device 20 according to the embodiment of the present invention will be described referring to FIGS. 4 through 7. FIG. 4 is a side view of the battery mounting device 20 according to the embodiment of the preset invention. FIG. 5 is an elevational view of the battery mounting device 20 according to the embodiment of the preset invention, which shows a state where the battery 22 and the toe board 26 are detached. FIG. 6 is a perspective view of the battery mounting device 20 according to the embodiment of the preset invention, which shows layout of wire harnesses extending from the battery 22. FIG. 7 is a sectional view of the battery mounting device 20 according to the embodiment of the preset invention, which shows an exhaust port of an exhaust duct.

As shown in FIGS. 4 and 5, the battery mounting device 20 comprises the battery 22, the toe board 26 covering the battery 22 from above, a fixing member 28 to fix the battery mounting device 20 onto the floor panel 24b, and a battery bracket 30 to support the battery 22. The battery mounting device 20 also has the cooling performance for cooling the battery 22, and further comprises an intake duct 32 as a cooling duct where air for cooling the battery 22 flows, a cooling fan 34 to supply the cooling air to the battery 22, and an exhaust duct 36 to exhaust the air having cooled the battery 22 into the cabin C. The battery mounting device 20 further comprises a heat exchange chamber 38 (FIG. 5) to cool the battery 22 through contacting of the air supplied from the intake duct 32 with a case (housing) of the battery 22 (FIG. 5).

The battery 22 of the present embodiment is a lithium ion battery which is stored in a nearly-rectangular metal-made case. The battery 22 is configured such that a front face 22a having a wide area is directed obliquely upwardly toward the passenger seat 14, and this front face 22a is covered with the toe board 26. A back face 22b of the battery 22 is fixedly supported by the battery bracket 30.

The fixing member 28 is made of a metal plate by pressing, and the battery mounting device 20 is configured to be fixed onto the vehicle 1 by fixing leg portions 28a, 28b of the fixing member 28 onto the floor panel 24b with bolts. The battery bracket 30 and the battery 22 are fixed such that they are inclined relative to the floor panel 24b by the fixing member 28.

The battery bracket 30 is made of a metal plate by pressing and configured to cover a side face of a part of the battery 22. The battery bracket 30 is attached to the fixing member 28 so as to support the battery 22 from a side of the back face 22b. Thereby, the battery 22 is fixed such that its front face 22a extends obliquely (i.e., is inclined) forwardly-and-upwardly. The battery bracket 30 is provided with arm portions 30a, 30b, 30c which extend toward the front face 22a of the battery 22. The toe board 26 is fixed above the front face 22a of the battery 22 by these arm portions 30a, 30b, 30c. Further, a bent portion 30d is formed at an outward end portion, in the vehicle width direction, of the battery bracket 30, and a part of an outward side face, in the vehicle width direction, of the battery 22 and a part of the cooling fan 34 are covered with this bent portion 30d.

The toe board 26 is a metal-made nearly-rectangular plate member, and is attached above the battery 22 substantially in parallel to the front face 22a of the battery 22. A bent portion 26a which is configured to be bent downwardly is formed at an outward end portion, in the vehicle width direction, of the toe board 26, and a part of the outward side face, in the vehicle width direction, of the battery 22 and a part of the cooling fan 34 are covered with this bent portion 26d. Further, a fragile portion 26b (FIG. 2) is provided at an inward end portion, in the vehicle width direction, of the toe board 26. As shown in FIG. 2, this fragile portion 26b is formed at a portion of the toe board 26 which is adjacent to the tunnel portion 10a of the vehicle 1, and configured to be deformed preferentially (before deformation of the other part of the toe board 26) when the vehicle 1 has a side collision or the like. The fragile portion 26b is configured to have a thinner plate thickness than the other part of the toe board so that fragile portion 26b can be easily deformed.

Further, as shown in FIG. 6, wire harnesses 23 for charging of the battery 22 and supplying of the electric power from the battery 22 are provided to extend, passing between the front face 22a of the battery 22 and the toe board 26. Herein, FIG. 6 illustrates a state where the driver's seat 12, the passenger seat 14, and the like are detached. The wire harnesses 23 extending from the battery 22 extend toward the inward side, in the vehicle width direction, of the vehicle 1 and then extend to a driver's-seat side beyond the tunnel portion 10a. Further, the wire harnesses 23 extend to a downward side of the floor panel 24b below the driver's seat 12 and then are coupled to the motor/generator 4 provided at the front part of the vehicle 1 (FIG. 1) and the like. Thus, the wire harnesses 23 are protected by the toe board 26 by being configured to extend through a space between the front face 22a of the battery 22 and a back face of the toe board 26. Herein, while electromagnetic waves are radiated to a surrounding area when the current flows through the wire harnesses 23, since the wire harnesses 23 are covered with the metal-made toe board 26, the electromagnetic waves radiated from the wire harnesses 23 are shielded. Thereby, it can be suppressed that the electromagnetic waves radiated from the wire harnesses 23 cause some bad influence in the cabin C.

Meanwhile, as shown in FIGS. 4 and 5, the intake duct 32 is an L-shaped duct which is provided on the inward side, in the vehicle width direction, of the battery 22, which comprises a horizontal part extending nearly horizontally and a vertical part extending downwardly from one end of the horizontal part. An intake port 32a to take in air into the cabin C which extends downwardly is provided at a tip of the horizontal part. The intake duct 32 is positioned below the fragile portion 26b of the toe board 26. Accordingly, the intake duct 32 is also easily deformed in a case where the fragile portion 26b of the toe board 26 is deformed in the side collision of the vehicle 1 or the like. Thereby, it can be properly prevented that the battery 22 which is disposed beside the intake duct 32 gets damage in the vehicle side collision or the like.

The heat exchange chamber 38 is a thin boxy member which is provided at the back face 22b of the battery 22, and configured to communicate with a lower end portion of the vertical part of the intake duct 32. An upper side of the heat exchange chamber 38 is entirely opened, and this opened portion is closed by the back face 22b of the battery 22. Thereby, when the air taken in through the intake duct 32 flows into the heat exchange chamber 38, the air flows along the back face 22b of the battery 22, thereby cooling the battery 22.

The cooling fan 34 is an air supply device which is attached to the heat exchange chamber 38 on an opposite side to the intake duct 32, and configured to make the cooling air cool the battery 22. That is, the cooling fan 34 is provided at the outward end portion, in the vehicle width direction, of the heat exchanger chamber 38 adjacently to the side face of the battery 22. When the cooling fan 34 is operated, the air in the cabin C is taken in from the intake port 32a into the intake duct 32, and reaches the cooling fan 34, passing through the inside of the heat exchange chamber 38. The air having cooled the battery 22 inside the heat exchange chamber 38 is exhausted into the cabin C through the exhaust duct 36 by means of the cooling fan 34. Further, as shown in FIG. 4, the cooling fan 34 is provided such that a part thereof overlaps the battery 22, when viewed from the side of the vehicle 1, so that the battery mounting device 20 is made properly compact as a whole. Moreover, the cooling fan 34 is coupled to a fan control device 34a (FIG. 4), and the cooling fan 34 is configured such that when the temperature of the battery 22 increases to a specified temperature or higher, the cooling fan 34 works.

The exhaust duct 36 is an air passage which is connected to a downstream side of the cooling fan 34, through which the air having cooled the battery 22 in the heat exchange chamber 38 is exhausted into the cabin C. That is, as shown in FIGS. 2 and 4, the exhaust duct 36 extends downwardly from the side face of the battery 22 and then extends up to a rearward side of the vehicle 1 along the floor panel 24b. Further, the exhaust duct 36 extending rearwardly along the floor panel 24b extends to a space below the passenger seat 14 beyond the second cross member 10d. That is, an exhaust port 36a provided at a tip of the exhaust duct 36 is positioned at the space below the passenger seat 14. Further, since a tip portion of the exhaust duct 36 is curved toward the outward side, in the vehicle width direction, of the vehicle 1, the exhaust port 36a of the exhaust duct 36 is directed to the side member 10b.

Moreover, as shown in FIGS. 2 and 7, the heater air duct 18a of the heater unit 18 extends in the space below the passenger seat 14 as well. In the present embodiment, the exhaust duct 36 is provided on the outward side, in the vehicle width direction, of the heater air duct 18a, and the heater air duct 18a and the exhaust duct 36 are provided such that they partially overlap each other, when viewed from the side face of the vehicle 1. Since the exhaust duct 36 extending from the outward side, in the vehicle width direction, of the vehicle 1 is disposed on the outward side of the heater air duct 18a extending from the inward side, in the vehicle width direction, of the vehicle 1 as described above, the heater air duct 18a and the exhaust duct 36 do not cross each other in the plan view as shown in FIG. 2.

Herein, the space below the passenger seat 14 is formed by the floor panel 24b which is located at a lower side, a seat cushion 14a of the passenger seat 14 which is located at an upper side, the tunnel portion 10a which is located at an inward side, and the side member 10b which is located at an outward side. Further, as shown in FIG. 2, the second cross member 10d is located at a forward side of the space below the passenger seat 14, and the first cross member 10c is located at a rearward side of the space below the passenger seat 14. Accordingly, the exhaust port 36a of the exhaust duct 36 is positioned on the forward side of the first cross member 10c and positioned on the rearward side of the second cross member 10d.

As described above, since the exhaust port 36a thorough which the exhaust air of the battery mounting device 20 is exhausted is directed toward the outward side in the vehicle width direction, the air exhausted from the exhaust port 36a hits against a surface (wall face) of the side member 10b and the like and is diffused (spreads) in the space below the passenger seat 14. Thereby, it can be prevented that the air exhausted from the exhaust port 36a flows out of the space below the passenger seat 14 directly. Accordingly, the air exhausted from the exhaust port 36a is diffused in the space below the passenger seat 14 and remains in this space, and flows out little by little at a small speed through gaps of the above-described members. Since the air which has cooled the battery 22 is made to be diffused and flow out into the cabin C as described above, it is unlikely that the passenger in the cabin C realizes the air being exhausted (flowing out) from the exhaust port 36a.

Meanwhile, the blowing port 18b of the heater air duct 18a is opened toward the rearward side of the vehicle 1 in the space below the passenger seat 14. Thereby, the heater air from the heater unit 18 is ejected from the space below the passenger seat 14 toward the rearward side of the vehicle 1 and guided to a position below the rear seat efficiently, thereby heating a foot space of the rear seat. Further, according to the blowing port 18b of the heater air duct 18a is disposed on the inward side, in the vehicle width direction, of the exhaust port 36a of the exhaust duct 36 and directed to the outward side, in the vehicle width direction, of the vehicle 1. Thereby, it can be prevented that the heater air from the blowing port 18b and the exhaust air from the exhaust port 36a interfere with each other and thereby bad influence is given to the heating performance or that the exhaust air from the exhaust port 36a goes directly toward the rear seat together with the heater air.

According to the battery mounting device 20 of the embodiment of the present invention, since the toe board 26 is provided in front of the passenger seat 14 at the position located at the lower level than the passenger seat 14 and the battery 22 is provided between the toe board 26 and the floor panel 24b of the vehicle 1 (FIG. 3), a sufficiently-large battery storage space can be secured, minimizing the feeling of oppression given to the passenger.

Further, according to the battery mounting device 20 of the present embodiment, since the toe board 26 is provided near the toe of the passenger to be inclined such that its forward side is located relatively at the higher level (FIG. 3), the passenger can utilize the toe board 26 a footrest, so that the feeling of oppression given to the passenger can be minimized, securing the sufficiently-large space for the battery 22. Further, since the battery 22 is covered with the toe board 26, it can be properly prevented that even in a case where the battery 22 receives an excessively-large force from the foot of the passenger during deceleration of the vehicle 1 or the like, the battery 22 gets damage because of this excessively-large force acting on the battery 22.

Also, according to the battery mounting device 20 of the present embodiment, since the battery 22 is inclined such that its forward side is located relatively at the higher level as well as the toe board 26 (FIG. 3), it is unlikely that there occurs a dead space below the toe board 26, thereby utilizing the space effectively.

Moreover, according to the battery mounting device 20 of the present embodiment, the fragile portion 26a is provided at the inward part, in the vehicle width direction, of the toe board 26 (FIG. 2). Thereby, this fragile portion 26a is deformed in the vehicle side collision or the like, so that the battery 22 is allowed to move and thereby it can be properly suppressed that the battery 22 itself gets some damage.

Further, according to the battery mounting device 20 of the present embodiment, since the intake duct 32 as the cooling duct is provided below the fragile portion 26a of the toe board 26, this intake duct 32 is deformed in the vehicle side collision or the like as well as the fragile portion 26a of the toe board, so that it can be properly suppressed that the battery 22 itself gets some damage.

Additionally, according to the battery mounting device 20 of the present embodiment, since the wire harnesses 23 are covered with the metal-made toe board 26 (FIG. 6), the electromagnetic waves radiated from the wire harnesses 23 can be shielded, so that the communication device and the like can be prevented from malfunctioning.

The present invention should not be limited to the above-described embodiment and any other modifications or improvements may be applied within the scope of a spirit of the present invention. In particular, while the above-described embodiment describes a case where the present invention is applied to the FR vehicle equipped with the engine and the motor/generator which are mounted on the front part of the vehicle, the present invention is applicable any type of vehicle equipped with the battery.

Further, while tare battery mounting device 20 has the cooling performance of the battery 22 in the above-described embodiment, the present invention is applicable to the battery mounting device without the cooling performance.

What is claimed is:

1. A battery mounting device, comprising:
   a battery mounted in a cabin of a vehicle; and
   a plate-shaped toe board provided in front of a passenger seat at a position located at a lower level than the passenger seat so as to cover the battery,
   wherein said battery is provided between said toe board and a floor panel of the vehicle,
   said toe board is arranged above the floor panel, said toe board being inclined such that a forward side of an inclined surface thereof is located at a higher level than a rearward side of the inclined surface,
   said battery is arranged above the floor panel and below said toe board, said battery being inclined such that a forward side thereof is located at a higher level than a rearward side thereof,
   a part of said floor panel behind a dash panel is inclined such that a forward side thereof is located at a higher level than a rearward side thereof,
   said toe board covers said battery from above, and
   the inclined surface of said toe board is positioned lower than a seating surface of the passenger seat.

2. The battery mounting device of claim 1, wherein said toe board is provided with a fragile portion at an inward part, in a vehicle width direction, of the toe board such that said fragile portion of the toe board is deformed preferentially in a vehicle side collision.

3. The battery mounting device of claim 2, wherein a cooling duct where battery-cooling air flows is provided below said fragile portion of the toe board.

4. The battery mounting device of claim 3, further comprising a wire harness electrically coupled to said battery, wherein said toe board is made of metal and provided so as to cover said wire harness.

5. The battery mounting device of claim 2, further comprising a wire harness electrically coupled to said battery, wherein said toe board is made of metal and provided so as to cover said wire harness.

6. The battery mounting device of claim 1, further comprising a wire harness electrically coupled to said battery, wherein said toe board is made of metal and provided so as to cover said wire harness.

7. A battery mounting device, comprising:
   a battery mounted in a cabin of a vehicle;
   a plate-shaped toe board provided in front of a passenger seat at a position located at a lower level than the passenger seat so as to cover the battery; and
   a wire harness electrically coupled to the battery,
   wherein said battery is provided between said toe board and a floor panel of the vehicle and provided to be inclined such that a forward side thereof is located at a higher level than a rearward side thereof,
   said toe board arranged above the floor panel is provided to be inclined such that a forward side of an inclined surface thereof is located at a higher level than a rearward side of the inclined surface, provided with a fragile portion at an inward part, in a vehicle width direction, of the toe board such that said fragile portion of the toe board is deformed preferentially in a vehicle side collision, and made of metal and provided so as to cover said wire harness,
   a cooling duct where battery-cooling air flows is provided below said fragile portion of the toe board,
   a part of the floor panel behind a dash panel is inclined such that a forward side thereof is located at a higher level than a rearward side thereof,
   said toe board covers said battery from above, and
   the inclined surface of said toe board is positioned lower than a seating surface of the passenger seat.

* * * * *